(12) United States Patent
Cooley

(10) Patent No.: US 11,255,255 B2
(45) Date of Patent: Feb. 22, 2022

(54) TURBOCHARGER INCLUDING A WASTEGATE ASSEMBLY

(71) Applicant: BorgWarner Inc., Auburn Hills, MI (US)

(72) Inventor: Matthew Brian Cooley, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 57 days.

(21) Appl. No.: 16/845,380

(22) Filed: Apr. 10, 2020

(65) Prior Publication Data
US 2021/0317775 A1 Oct. 14, 2021

(51) Int. Cl.
*F02B 37/18* (2006.01)
*F04D 27/00* (2006.01)

(52) U.S. Cl.
CPC .......... *F02B 37/183* (2013.01); *F04D 27/009* (2013.01); *F05D 2220/40* (2013.01); *F05D 2230/10* (2013.01); *F05D 2230/60* (2013.01); *F05D 2260/606* (2013.01)

(58) Field of Classification Search
CPC .... F02B 37/183; F02B 37/186; F04D 27/009; F05D 2220/40; F05D 2230/10; F05D 2230/60; F05D 2260/606
USPC .......................................................... 60/602
See application file for complete search history.

(56) References Cited

U.S. PATENT DOCUMENTS

| | | | |
|---|---|---|---|
| 10,024,166 B2 | 7/2018 | Zollinger et al. | |
| 10,041,351 B2 | 8/2018 | Zollinger et al. | |
| 10,683,795 B2 * | 6/2020 | Sparer | F02B 37/183 |
| 10,883,416 B2 * | 1/2021 | Walkingshaw | F02B 37/183 |
| 2011/0000209 A1 * | 1/2011 | Boening | F02B 37/183 60/602 |
| 2015/0115189 A1 * | 4/2015 | Jung | F02B 37/183 251/279 |

(Continued)

FOREIGN PATENT DOCUMENTS

| | | |
|---|---|---|
| DE | 102008031323 A1 | 1/2010 |
| DE | 102014225966 A1 | 6/2016 |

(Continued)

OTHER PUBLICATIONS

English language abstract and machine-assisted English language translation for DE 10 2008 031 323 extracted from espacenet.com database on Jun. 11, 2020, 5 pages.

(Continued)

*Primary Examiner* — Thai Ba Trieu

(74) *Attorney, Agent, or Firm* — Howard & Howard Attorneys PLLC

(57) ABSTRACT

A turbocharger includes a turbine housing and a wastegate assembly. The turbine housing has a wastegate duct defining a wastegate channel and a valve seat disposed about the wastegate channel. The wastegate assembly has a valve body engageable with the valve seat and a shaft fixed to the valve body at a connection interface for selectively engaging the valve body with the valve seat at a first plane. The connection interface has a centroid and a second plane tangential to the centroid. A second axis is normal to the second plane and is angularly tilted relative to a first axis normal to the first plane at which the valve body and the valve seat are engaged.

20 Claims, 13 Drawing Sheets

(56) References Cited

U.S. PATENT DOCUMENTS

| | | | |
|---|---|---|---|
| 2016/0032818 A1* | 2/2016 | Mallett | F16K 1/2042 |
| | | | 251/318 |
| 2018/0193967 A1 | 7/2018 | Ruh et al. | |
| 2020/0141308 A1* | 5/2020 | DePaoli | F02B 37/183 |
| 2020/0200072 A1* | 6/2020 | Cooley | F01D 17/105 |
| 2021/0172370 A1* | 6/2021 | Milburn | F02C 5/00 |

FOREIGN PATENT DOCUMENTS

| | | | | |
|---|---|---|---|---|
| DE | 102016002859 A1 * | 9/2017 | | F02B 37/183 |
| DE | 202018002846 U1 | 6/2018 | | |
| GB | 1443887 A * | 7/1976 | | F16K 1/24 |
| WO | 2015171541 A1 | 11/2015 | | |

OTHER PUBLICATIONS

Machine-Assisted English language abstract and machine-assisted English language translation for DE 10 2014 225 966 extracted from espacenet.com database on Jun. 11, 2020, 13 pages.

Machine-Assisted English language abstract and machine-assisted English language translation for DE 20 2018 002 846 extracted from espacenet.com database on Jun. 11, 2020, 11 pages.

\* cited by examiner

TURBOCHARGER INCLUDING A WASTEGATE ASSEMBLY

BACKGROUND OF THE INVENTION

1. Field of the Invention

The present invention relates generally to a turbocharger for delivering compressed air to an internal combustion engine.

2. Description of the Related Art

Turbochargers deliver compressed air to an internal combustion engine by receiving exhaust gas from the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine housing having a wastegate duct defining a wastegate channel and a valve seat disposed about the wastegate channel. Typical turbochargers also include a wastegate assembly having a valve body engageable with the valve seat and having a shaft fixed to the valve body at a connection interface for selectively engaging the valve body with the valve seat along a first plane. In conventional wastegate assemblies, the connection interface is parallel to the first plane along which the valve body and the valve seat are engaged.

Conventional turbochargers commonly exhaust the exhaust gas to a catalytic converter to purify the exhaust gas before being expelled from the vehicle. Typical catalytic converters, however, have a catalyst brick face that must reach an operating temperature to be able to purify the exhaust gas. Typically, exhaust gas travels through the wastegate channel of the wastegate duct when the valve body of the wastegate assembly is disengaged with the valve seat. During operation of the turbocharger, the exhaust gas travels from wastegate channel to the catalyst brick face and raises the temperature of the catalyst brick face as the exhaust gas travels through the catalytic converter.

During start-up of the internal combustion engine, however, the catalyst brick face has yet to achieve the operating temperature necessary to purify the exhaust gas traveling through the catalytic converter. As such, the exhaust gas is not purified during start-up of the internal combustion engine and environmental emission targets may not be achieved. The time elapsed between start-up and the catalyst brick face reaching operating temperature is influenced in part by the design of the wastegate assembly. Conventional wastegate assemblies negatively influence the time elapsed between start-up and the catalyst brick face reaching operating temperature because conventional wastegate assemblies do not evenly direct the exhaust gas over the catalyst brick face, resulting in an uneven distribution in the temperature of the catalyst brick face. The uneven temperature distribution results in longer times elapsed before reaching operating temperature and results in poorer performance in achieving emissions targets.

Additionally, many conventional wastegate assemblies require the valve body and the shaft to be fixed together at the connection interface while both the valve body and the shaft are inside the turbine housing. Typically, the valve body and the shaft are required to be fixed inside the turbine housing to ensure that the valve body and the valve seat can be selectively engaged along the first plane to prevent any leakage of exhaust gas through the wastegate channel defined by the wastegate duct when the valve body and the valve seat are intended to be engaged.

Because many conventional wastegate assemblies require the valve body and the shaft to be fixed together at the connection interface while both the valve body and the shaft are inside the housing, a direct line of sight from the connection interface and through an opening defined by the turbocharger and to a welding machine is required to adequately fix the valve shaft to the valve body. The direct line of sight is required so that the welding machine is able to transmit energy through an energy zone to the connection interface to fix the valve body to the shaft.

However, because the direct line of sight from the welding machine to the connection interface is required, and because the connection interface is parallel to the first plane along which the valve body and the valve seat are engaged in conventional wastegate assemblies, the placement of the connection interface and thus also the placement of the wastegate assembly inside the turbine housing is disadvantageously limited. Because the placement of the wastegate assembly is limited, the optimal placement of the wastegate assembly to evenly direct the flow of exhaust gas over the catalyst brick face to minimize the time elapsed between start-up and the catalyst brick face reaching operating temperature is difficult to manufacture. As such, conventional wastegate assemblies are manufactured in a sub-optimal placement in the turbine housing to purify exhaust gas during start-up of the internal combustion engine, allowing flow of exhaust gas to impinge on and transfer heat to the turbine housing, resulting in poorer performance in achieving emissions targets.

As such, there remains a need to provide an improved wastegate assembly for a turbocharger.

SUMMARY AND ADVANTAGES

The present invention provides a turbocharger for delivering compressed air to an internal combustion engine. The turbocharger includes a turbine housing having a wastegate duct defining a wastegate channel and having a valve seat disposed about the wastegate channel. The wastegate assembly has a valve body engageable with the valve seat and a shaft fixed to the valve body at a connection interface for selectively engaging the valve body with the valve seat at a first plane. The connection interface has a centroid and a second plane tangential to the centroid. A second axis normal to the second plane is angularly tilted relative to a first axis normal to the first plane at which the valve body and the valve seat are engaged.

During start-up of the internal combustion engine, the wastegate duct directs flow of exhaust gas to a catalyst brick face to purify the exhaust gas traveling through the catalytic converter. The time elapsed between start-up and the catalyst brick face reaching an operating temperature necessary to purify the exhaust gas is influenced in part by the design of the wastegate assembly. The wastegate assembly allows optimal placement of the wastegate assembly to quickly achieve the operating temperature necessary to purify the exhaust gas traveling through the catalytic converter by evenly directing the exhaust gas over the catalyst brick face, resulting in an even distribution in the temperature of the catalyst brick face. As such, the wastegate assembly prevents flow of exhaust gas from impinging on and transferring heat to the turbine housing, resulting in better performance in environmental emission targets being achieved.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
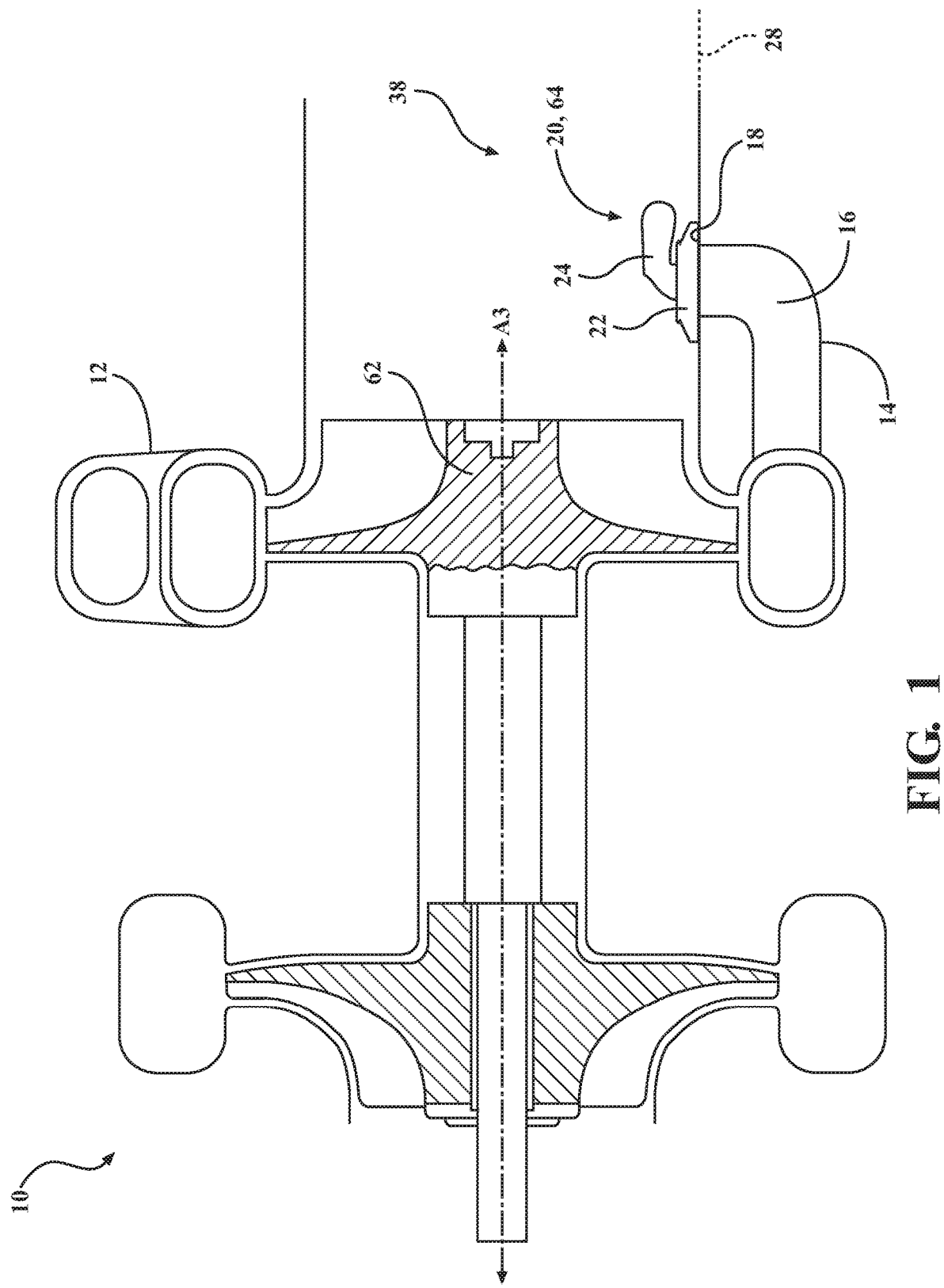
FIG. 1 is a schematic illustration of a turbocharger including a turbine housing having a wastegate duct defining a wastegate channel and a valve seat disposed about the wastegate channel, and including a wastegate assembly that is a dual block wastegate.
Figure 3:
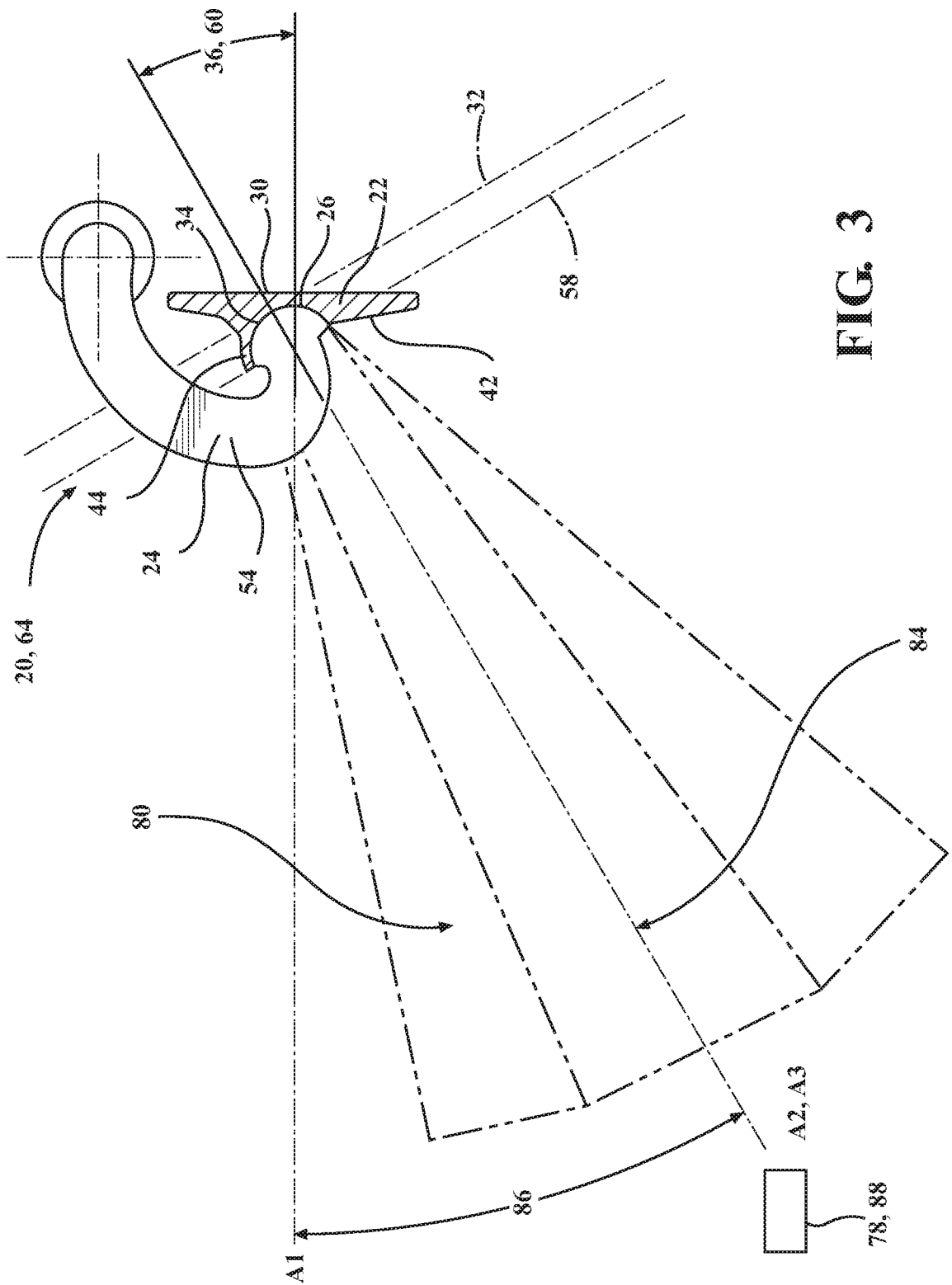
FIG. 3 is a partial cross-sectional view of the wastegate assembly having a valve body engageable with the valve seat and a shaft fixed to the valve body at a connection interface for selectively engaging the valve body with the valve seat at a first plane, with the connection interface having a centroid, a second plane tangential to the centroid, and a second axis normal to the second plane being angularly tilted relative to a first axis normal to the first plane at which the valve body and the valve seat are engaged.
Figure 4A:
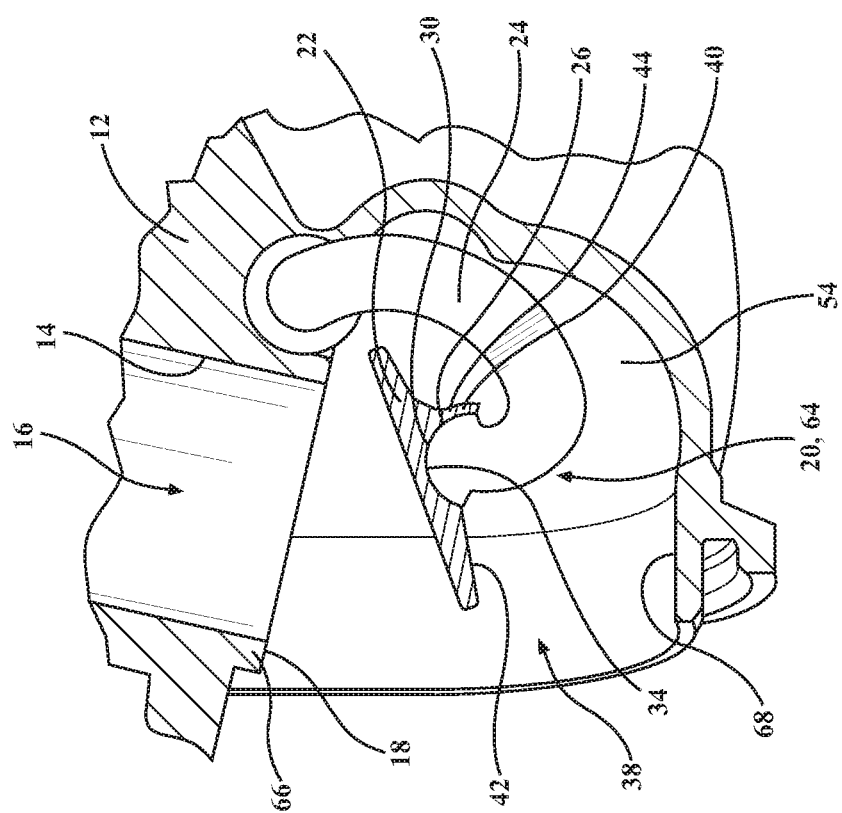
FIG. 4A is a partial cross-sectional view of the wastegate assembly in the turbine housing, with the valve body disengaged with the valve seat, and with the wastegate duct having a cylindrical wall extending from an inner surface of the turbine housing to the valve seat.
Figure 4B:
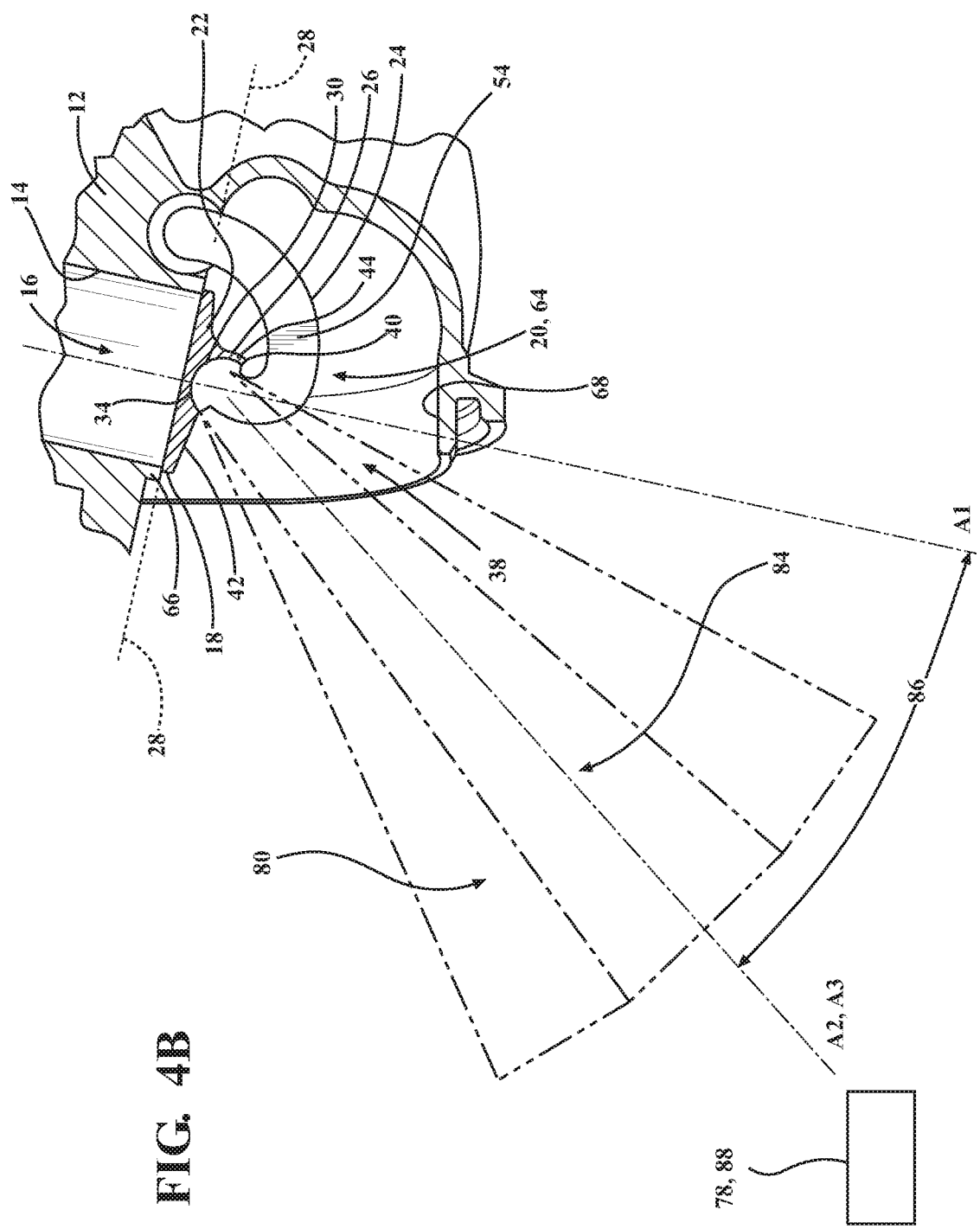
FIG. 4B is a partial cross-sectional view of the wastegate assembly in the turbine housing, with the valve body engaged with the valve seat along the first plane, and with the valve body and the shaft welded at the connection interface such that the connection interface has a weld line that is angularly tilted relative to the first axis normal to the first plane.

With reference to the Figures, wherein like numerals indicate like parts throughout the several views, a turbocharger 10 is shown schematically in FIG. 1. The turbocharger 10 is for delivering compressed air to an internal combustion engine. The turbocharger 10 delivers compressed air to the internal combustion engine by receiving exhaust gas from the internal combustion engine. The turbocharger 10 comprises a turbine housing 12 having a wastegate duct 14 defining a wastegate channel 16 and a valve seat 18 disposed about the wastegate channel 16. The turbocharger 10 also comprises a wastegate assembly 20. As best shown in FIGS. 3, 4A, and 4B, the wastegate assembly 20 has a valve body 22 engageable with the valve seat 18 and a shaft 24 fixed to the valve body 22 at a connection interface 26 for selectively engaging the valve body 22 with the valve seat 18 at a first plane 28. The connection interface 26 has a centroid 30 and a second plane 32 tangential to the centroid 30, and a second axis A2 normal to the second plane 32 is angularly tilted relative to a first axis A1 normal to the first plane 28 at which the valve body 22 and the valve seat 18 are engaged.

During start-up of the internal combustion engine, the wastegate duct 14 directs flow of exhaust gas to a catalyst brick face to purify the exhaust gas traveling through the catalytic converter. The time elapsed between start-up and the catalyst brick face reaching an operating temperature necessary to purify the exhaust gas is influenced in part by the design of the wastegate assembly 20. The design of the wastegate assembly 20 allows optimal placement of the wastegate assembly 20 to quickly achieve the operating temperature necessary to purify the exhaust gas traveling through the catalytic converter by evenly directing the exhaust gas over the catalyst brick face, resulting in an even distribution in the temperature of the catalyst brick face. As such, the wastegate assembly 20 prevents flow of exhaust gas from impinging on and transferring heat to the turbine housing 12, resulting in better performance in environmental emission targets being achieved.

The shaft 24 may be fixed to the valve body 22 numerous ways. For example, in one embodiment, the shaft 24 is fixed to the valve body 22 by welding the shaft 24 to the valve body 22. In this embodiment, the valve body 22 and the shaft 24 are welded at the connection interface 26 such that the connection interface 26 has a weld line 34 that is angularly tilted relative to the first axis A1 normal to the first plane 28, as shown in FIG. 4B. Alternatively, the shaft 24 may be fixed to the valve body 22 though soldering, brazing, or through use of an epoxy or other adhesive.

The second axis A2 normal to the second plane 32 may be angularly tilted relative to the first axis A1 normal to the first plane 28 at a first angle 36, as shown in FIG. 3. The first angle 36 may be between 10 and 70 degrees, between 30 and 60 degrees, or between 40 and 50 degrees. On the other hand, in other, alternative embodiments, it is to be appreciated that the first angle 36 at which the second axis A2 is angularly tilted relative to the first axis A1 may even be less than 10 degrees or more than 70 degrees. It is also to be appreciated that the exact degrees of the first angle 36 at which the second axis A2 is angularly tilted relative to the first axis A1 depends on several factors. These factors include, but are not limited to, the placement of the wastegate assembly within the turbine housing 12, the relative dimensions of the turbine housing 12, particularly the dimensions of a turbine housing outlet 38 defined by the turbine housing 12, and the relative dimensions of the wastegate assembly 20 and components of the wastegate assembly 20, including the shaft 24 and the valve body 22.

Figure 2:
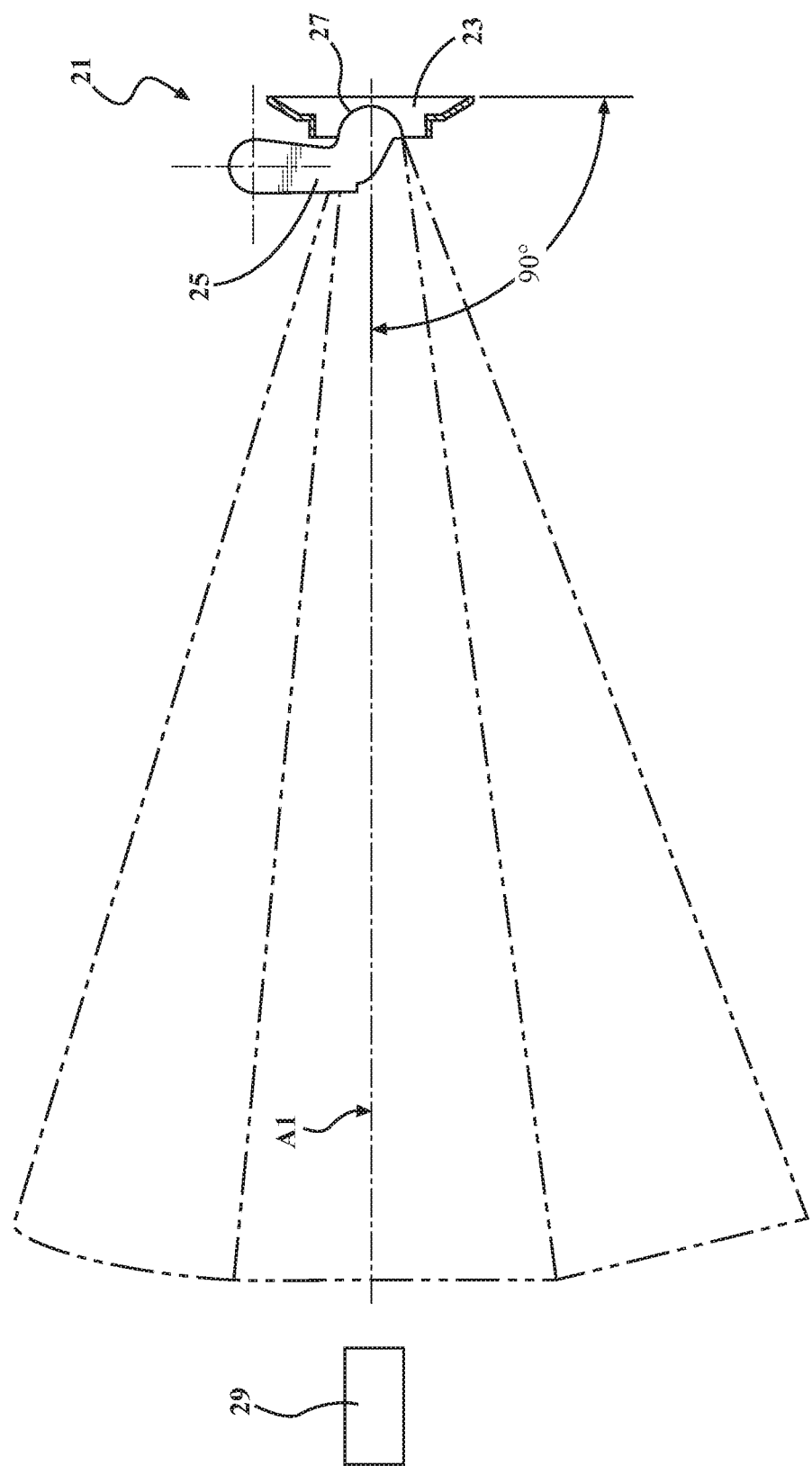
FIG. 2 is a partial cross-sectional view of a prior art wastegate assembly and a prior art energy zone normal to a valve body of the conventional wastegate assembly.

As shown in FIG. 2, a conventional wastegate assembly 21 in the prior art has a conventional valve body 23 and a conventional shaft 25 fixed to the conventional valve body 23 at a conventional connection interface 27 for selectively engaging the conventional valve body 23 with the valve seat 18 at the first plane 28. The conventional connection interface 27 is angled from the first plane 28 at approximately a ninety-degree angle. A conventional welding machine 29 is required to be located along the first axis A1 and normal to the first plane 28 because the conventional connection interface 27 is angled from the first plane 28 at approximately the ninety-degree angle. As such, the first axis A1 normal to the first plane 28 must extend out of the turbine housing outlet 38 so the conventional welding machine 29 is able to fix the conventional shaft 25 to the conventional valve body 23 at the conventional connection interface 27, thereby limiting the placement of the conventional wastegate assembly 21 and allowing flow of exhaust gas to impinge on and transfer heat to the turbine housing 12, resulting in poorer performance in achieving environmental emission targets.

The connection interface 26 between the shaft 24 and the valve body 22 may be one of numerous configurations. For example, in one embodiment, the valve body 22 at the connection interface 26 is convex in relation to the first plane 28, as shown in FIG. 6B. Alternatively, in another embodiment, the valve body 22 at the connection interface is concave in relation to the first plane 28, as shown in FIG. 5B. More specifically, a distal end 40 of the valve body 22, furthest from the valve seat 18 when the valve body 22 and the valve seat 18 are engaged, may be convex or concave in relation to the first plane 28. The shaft 24 at the connection interface 26 may be convex or concave in relation to the first plane 28 to correspond to the configuration of the valve body 22 at the connection interface 26 and form a seal between the shaft 24 and the valve body 22 at the connection interface 26.

For example, in the embodiment where the valve body 22 at the connection interface 26 is convex in relation to the first plane 28, the shaft 24 at the connection interface 26 is concave in relation to the first plane 28 to correspond to the configuration of the valve body 22. Alternatively, in the embodiment where the valve body 22 at the connection interface 26 is concave in relation to the first plane 28, the shaft 24 at the connection interface 26 is convex in relation to the first plane 28 to correspond to the configuration of the valve body 22. In both the embodiment where the valve body 22 at the connection interface 26 is convex and the shaft 24 at the connection interface 26 is concave, and the embodiment where the valve body 22 at the connection interface 26 is concave and the shaft 24 at the connection interface 26 is convex, the valve body 22 and the shaft 24 form a ball-and-socket configuration. In the ball-and-socket configuration, the convex component (i.e., either the valve body 22 or the shaft 24) is the ball in the ball-and-socket configuration and the concave component (i.e., either the valve body 22 or the shaft 24) is the socket in the ball-and-socket configuration.

It is to be appreciated that other configurations of the connection interface 26 are also possible, including the valve body 22 being planar in relation to the first plane 28 or polygonal in relation to the first plane 28, among other possible configurations. In these embodiments, the configuration of the shaft 24 at the connection interface 26 also corresponds to the configuration of the valve body 22.

Figure 5A:
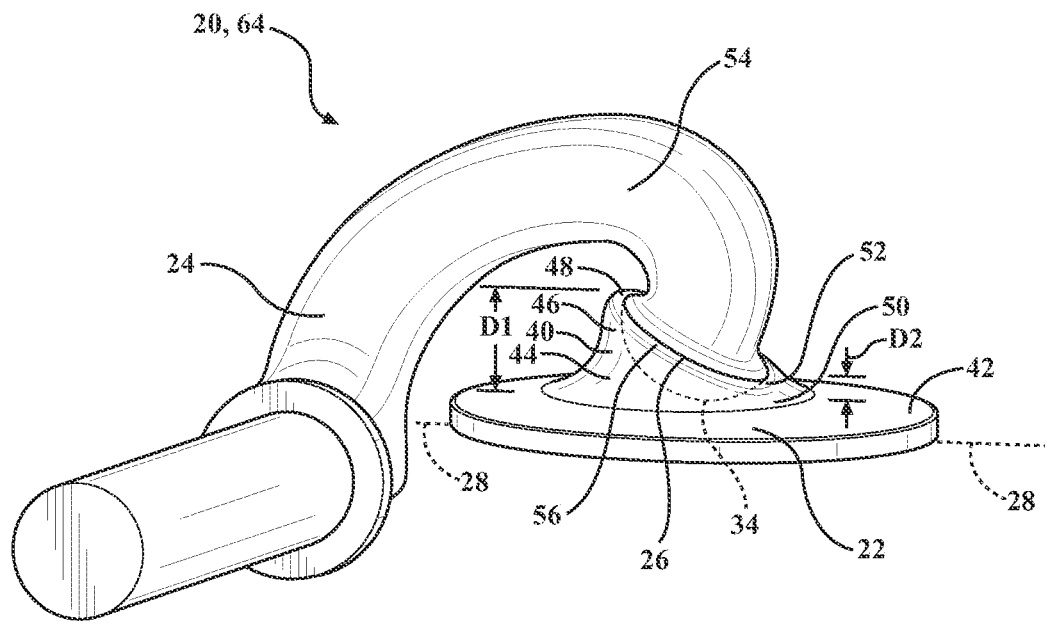
FIG. 5A is a perspective view of the wastegate assembly, with the valve body having an upper surface and a shaft receiver extending away from the upper surface, defining the connection interface, having a first portion extending a first distance away from the upper surface, having a second portion extending a second distance away from the upper surface, with the first distance greater than the second distance.
Figure 5B:
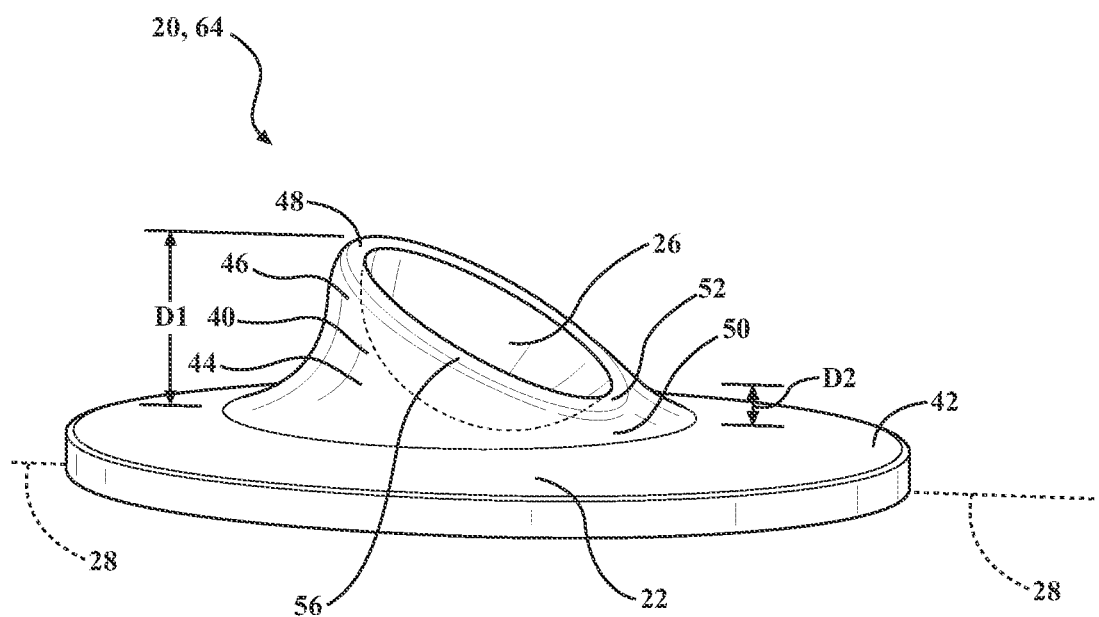
FIG. 5B is a perspective view of the valve body of the wastegate assembly in FIG. 5A, where the valve body at the connection interface is concave in relation to the first plane.
Figure 6A:
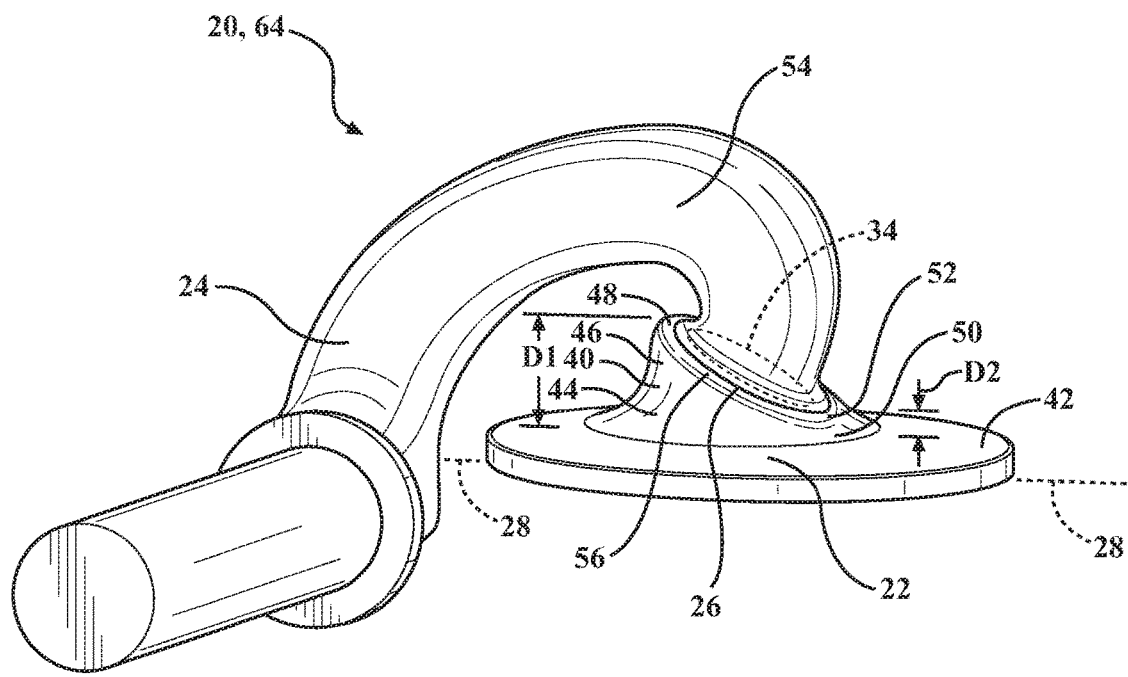
FIG. 6A is a perspective view of the wastegate assembly, where the shaft has a curved portion being substantially C-shaped that extends such that the first portion is disposed between the curved portion and the upper surface, where the first and second portions of the shaft receiver together define an outer rim, and where the outer rim extends at a third plane angularly tilted relative to the first axis.
Figure 6B:
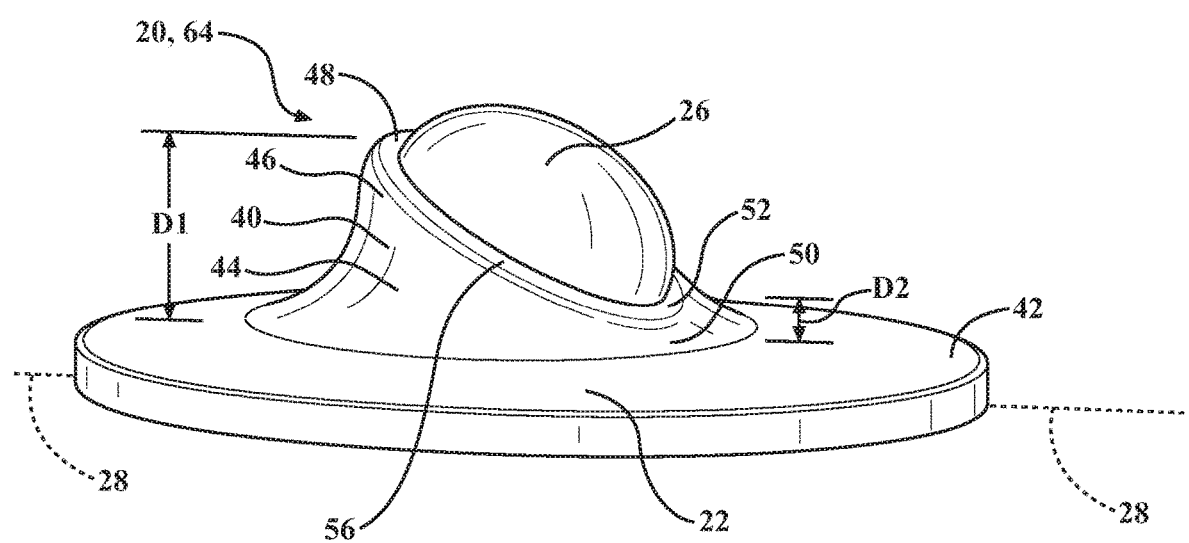
FIG. 6B is a perspective view of the valve body of the wastegate assembly in FIG. 6A, where the valve body at the connection interface is convex in relation to the first plane.

As shown in FIGS. 5A and 6A, the valve body 22 has an upper surface 42 that, in some embodiments, extends substantially parallel to the first plane 28. In these embodiments, the valve body 22 has a shaft receiver 44 extending away from the upper surface 42 of the valve body 22 and the shaft receiver 44 defines the connection interface 26. The upper surface 42 need not extend completely parallel to the first plane 28, but instead may be angled relative to the first plane 28. For instance, the upper surface 42 may extend about the shaft receiver 44 such that the upper surface 42 extends from the shaft receiver 44 toward the valve seat 18 when the valve body 22 is engaged with the valve seat 18.

Additionally, in the embodiments where the valve body 22 has the shaft receiver 44 extending away from the upper surface 42 of the valve body 22, the shaft receiver 44 may be concave or convex in relation to the first plane 28 to receive the correspondingly concave or convex shaft 24.

In certain embodiments, the shaft receiver 44 of the valve body 22 has a first portion 46 extending a first distance D1 away from the upper surface 42 at a point 48 on the first portion 46 furthest away from the upper surface, and has a second portion 50 extending a second distance D2 away from the upper surface 42 at a point 52 on the second portion 50 closest to the upper surface 42. In these embodiments, the first distance D1 is greater than the second distance D2. The first portion 46 of the shaft receiver 44 may form approximately half of the shaft receiver 44, while the second portion 50 of the shaft receiver 44 may form approximately a corresponding half of the shaft receiver 44.

The shaft 24 may have a curved portion 54 being substantially C-shaped that extends such that the first portion 46 of the shaft receiver 44 is disposed between the curved portion 54 of the shaft 24 and the upper surface 42 of the valve body 22, as shown in FIGS. 5A and 6A. The curved portion 54 assists in engaging and disengaging the valve body 22 with the valve seat 18.

In some embodiments, the first and second portions 46, 50 of the shaft receiver 44 together define an outer rim 56 extending circumferentially about the second axis A2 normal to the second plane 32. The outer rim 56 may extend completely circumferentially about the second axis A2 or only partially circumferentially about the second axis A2. In some embodiments, the outer rim 56 is planar. In these embodiments, the outer rim 56 extends at a third plane 58, and the third plane 58 is angularly tilted relative to the first axis A1 normal to the first plane 28 at a second angle 60 that is typically between 10 and 70 degrees, between 30 and 60 degrees, or between 40 and 50 degrees. On the other hand, in other, alternative embodiments, it is to be appreciated that the second angle 60 may even be less than 10 degrees or more than 70 degrees. It is also to be appreciated that the exact degrees of the second angle 60 at which the third plane 58 is angularly tilted relative to the first axis A1 depends on, but is not limited to, the placement of the wastegate assembly 20 within the turbine housing 12; the relative dimensions of the turbine housing 12, particularly the dimensions of the turbine housing outlet 38 defined by the turbine housing 12; and the relative dimensions of the wastegate assembly 20 and components of the wastegate assembly 20, including the shaft 24, the valve body 22, the shaft receiver 44, and the outer rim 56.

It is to be appreciated that the first angle 36 at which the second axis A2 is angularly tilted relative to the first axis A1 may be the same as the second angle 60 at which the third plane 58 is angularly tilted relative to the first axis A1. For instance, in the embodiment where the first angle 36 and the second angle 60 are the same, the connection interface 26 and the outer rim 56 may be considered to be symmetrical such that the second plane 32 tangential to the centroid 30 of the connection interface 26 is parallel to the third plane 58 at which the outer rim 56 extends. It is also to be appreciated that the first angle 36 at which the second axis A2 is angularly tilted relative to the first axis A1 may be different than the second angle 60 at which the third plane 58 is angularly tilted relative to the first axis A1. For instance, in the embodiment where the first angle 36 and the second angle 60 are different, the connection interface 26 and the outer rim 56 may be considered to be asymmetrical such that the second plane 32 tangential to the centroid 30 of the connection interface 26 can intersect the third plane 58 at which the outer rim 56 extends.

In certain embodiments, as shown in FIG. 4B, the first axis A1 normal to the first plane 28 does not extend through the turbine housing outlet 38 defined by the turbine housing 12. The turbine housing outlet 38 defined by the turbine housing 12 is used to expel exhaust gas from the turbocharger 10 after transferring energy to a turbine wheel 62. The placement of the wastegate assembly 20, therefore, is not limited to areas of the turbine housing 12 where the first axis A1 extends through the turbine housing outlet 38 defined by the turbine housing 12, which allows the optimal placement of the wastegate assembly 20 to prevent flow of exhaust gas from impinging on and transferring heat to the turbine housing 12, resulting in better performance in environmental emission targets being achieved. In other words, the placement of the wastegate assembly 20 may be in areas of the turbine housing 12 where the first axis A1 does not extend through the turbine housing outlet 38 defined by the turbine housing 12, and in which the first axis A1 instead extends into the turbine housing 12, which may allow the optimal placement of the wastegate assembly 20 to prevent flow of exhaust gas from impinging on and transferring heat to the turbine housing 12, resulting in better performance in environmental emission targets being achieved.

In certain embodiments, the second axis A2 normal to the second plane 32 tangential to the centroid 30 of the connection interface 26 extends through the turbine housing outlet 38 defined by the turbine housing 12. In these embodiments, the placement of the wastegate assembly 20 in the turbine housing 12 is limited to areas of the turbine housing 12 where the second axis A2 extends through the turbine housing outlet 38 defined by the turbine housing 12. This limitation on the placement of the wastegate assembly 20 is advantageous because the direct line of sight clearance exists between the connection interface 26 and exterior to the turbine housing 12 to more easily allow fixation of the shaft 24 to the valve body 22.

The wastegate assembly 20 may be a dual block wastegate 64. In the embodiments where the wastegate assembly 20 is the dual block wastegate 64, the shaft 24 and the valve body 22 are fixed together inside of the turbine housing 12 to ensure the seal between the valve body 22 and the valve seat 18 at the first plane 28 to prevent leakage of exhaust gas flowing through the wastegate channel 16 of the wastegate duct 14. It is to be appreciated, however, that the wastegate assembly 20 may be other types of wastegate assemblies 20, such as a wastegate assembly 20 including a washer and a spring or a wastegate assembly 20 having three or more components fixed together.

In some embodiments, as shown in FIG. 4A, the wastegate duct 14 has a cylindrical wall 66 extending from an inner surface 68 of the turbine housing 12 to the valve seat 18. The cylindrical wall 66 further increases the flexibility regarding the placement of the wastegate assembly 20 within the turbine housing 12 by allowing the wastegate assembly 20 to be centrally located within the turbine housing 12, which may allow the optimal placement of the wastegate assembly 20 to prevent flow of exhaust gas from impinging on and transferring heat to the turbine housing 12, resulting in better performance in environmental emission targets being achieved.

Figure 7A:
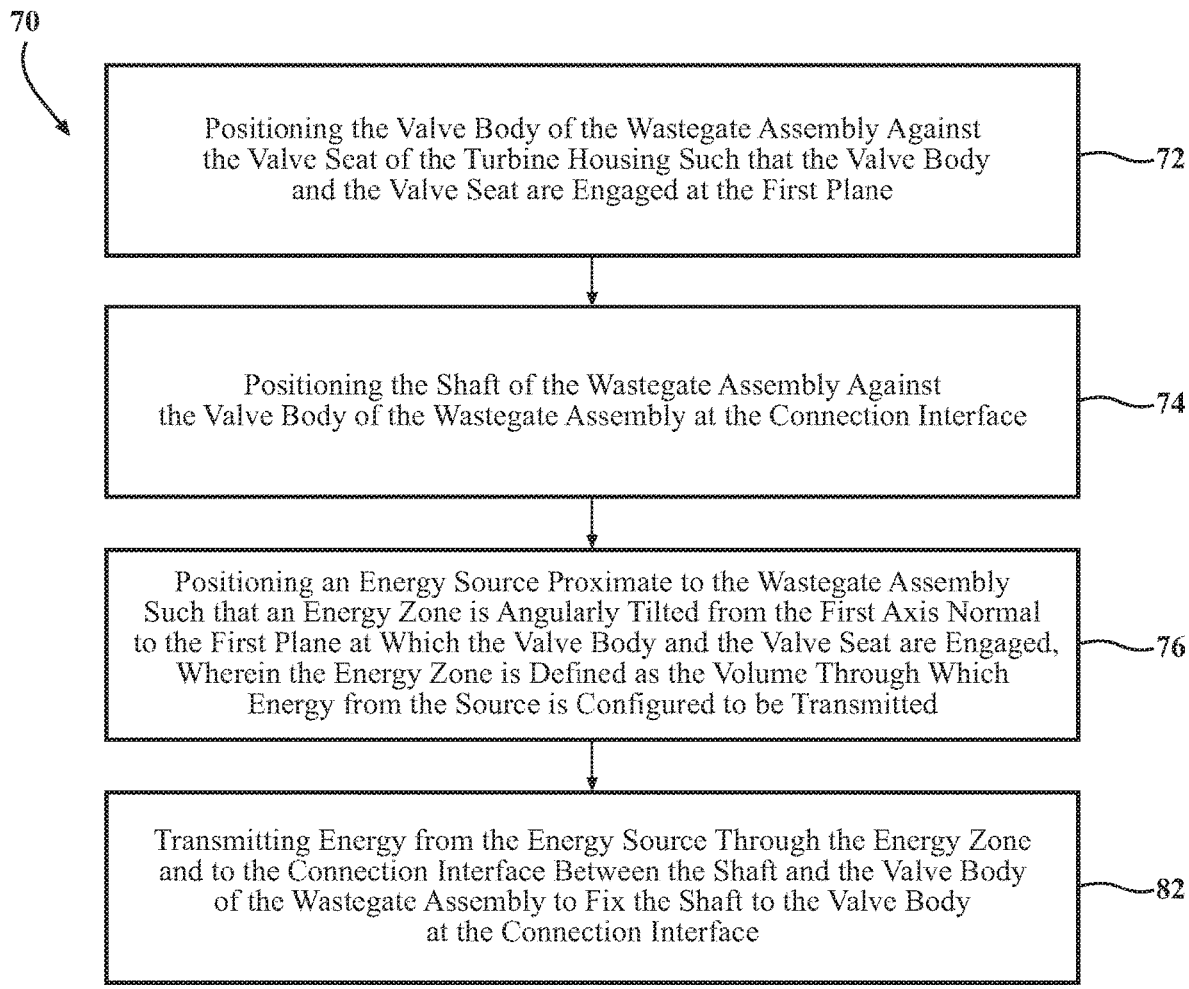
FIG. 7A is a flowchart of a method of manufacturing the turbocharger including the steps of positioning the valve body against the valve seat such that the valve body and the valve seat are engaged at the first plane, positioning the shaft against the valve body at the connection interface, positioning an energy source proximate the wastegate assembly such that an energy zone is angularly tilted from the first axis normal to the first plane, and transmitting energy from the energy source through the energy zone and to the connection interface to fix the shaft to the valve body at the connection interface.

As shown in FIG. 7A, a method 70 of manufacturing the turbocharger 10 includes the step 72 of positioning the valve body 22 of the wastegate assembly 20 against the valve seat 18 of the turbine housing 12 such that the valve body 22 and the valve seat 18 are engaged at the first plane 28. The method 70 also includes the step 74 of positioning the shaft 24 of the wastegate assembly 20 against the valve body 22 of the wastegate assembly 20 at the connection interface 26. The method 70 further includes the step 76 of positioning an energy source 78 proximate to the wastegate assembly 20 such that an energy zone 80 is angularly tilted from the first axis A1 normal to the first plane 28 at which the valve body 22 and the valve seat 18 are engaged. The energy zone 80 is defined as the volume through which energy from the energy source 78 is configured to be transmitted. The method 70 further includes the step 82 of transmitting energy from the energy source 78 through the energy zone 80 and to the connection interface 26 between the shaft 24 and the valve body 22 of the wastegate assembly 20 to fix the shaft 24 to the valve body 22 at the connection interface 26.

When the valve body 22 and the valve seat 18 are engaged, the wastegate assembly 20 is in a closed position such that little to no exhaust gas is able to flow through the wastegate channel 16 defined by the wastegate duct 14. When the valve body 22 and the valve seat 18 are disengaged, the wastegate assembly 20 is in an open position such that exhaust gas is free to flow through the wastegate channel 16 defined by the wastegate duct 14.

The method 70 decouples the placement and orientation of the wastegate assembly 20 from the location of the turbine housing outlet 38 of the turbine housing 12 by removing the constraint on placement and orientation of the wastegate assembly 20 caused by the energy zone 80. As such, the method 70 allows optimal placement of the wastegate assembly 20 to quickly achieve the operating temperature necessary to purify the exhaust gas traveling through the catalytic converter by evenly directing the exhaust gas over the catalyst brick face, resulting in an even distribution in the temperature of the catalyst brick face. As such, the method 70 allows the optimal placement of the wastegate assembly 20 to prevent flow of exhaust gas from impinging on and transferring heat to the turbine housing 12, resulting in better performance in environmental emission targets being achieved.

Figure 7B:
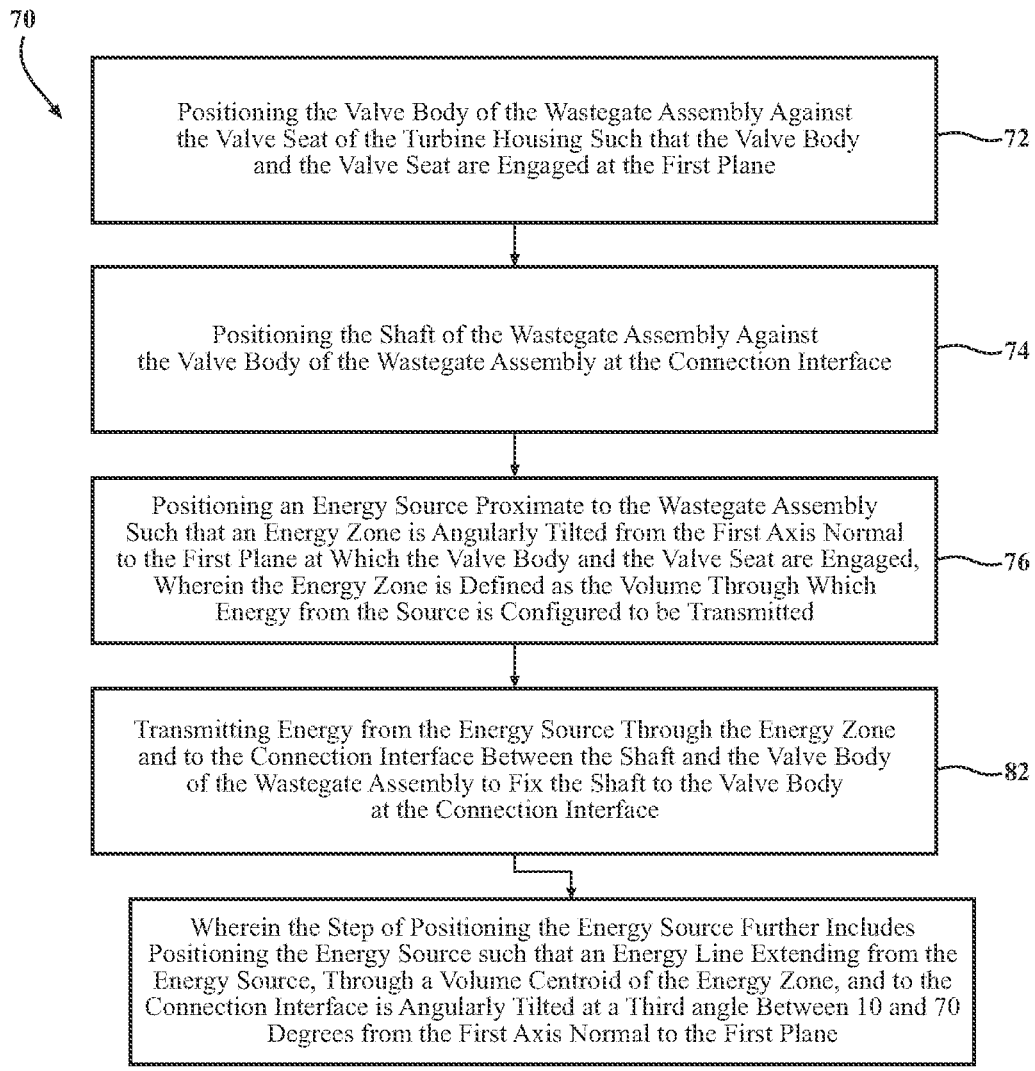
FIG. 7B is a flow chart of the method of FIG. 7A, wherein the step of positioning the energy source further includes positioning the energy source such that an energy line extending from the energy source, through a volume centroid of the energy zone, and to the connection interface is angularly tilted at a third angle between 10 and 70 degrees from the first axis.

The step 76 of positioning the energy source may also include positioning the energy source 78 such that an energy line 84 extending from the energy source 78, through a volume centroid 30 of the energy zone 80, and to the connection interface 26 is angularly tilted at a third angle 86 between 10 and 70 degrees from the first axis A1 normal to the first plane 28, as shown in FIG. 7B. It is to be appreciated that the third angle 86 may be between 10 and 70 degrees, between 30 and 60 degrees, or between 40 and 50 degrees from the first axis A1 normal to the first pane 28. On the other hand, in other, alternative embodiments, it is to be appreciated that the third angle 86 may even be less than 10 degrees or more than 70 degrees. In these embodiments, the energy line 84 is the centermost line through the energy zone 80.

Figure 7C:
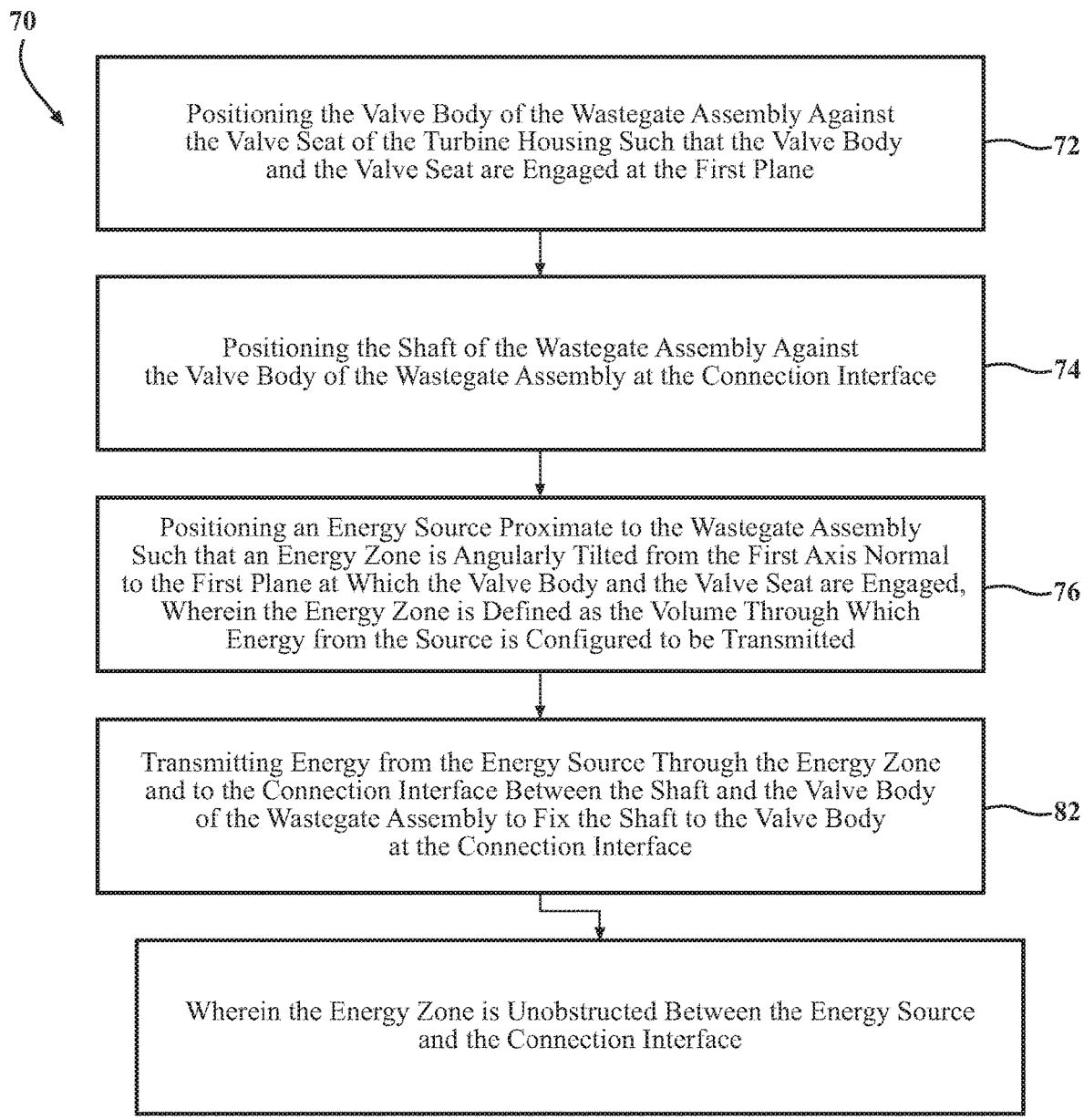
FIG. 7C is a flow chart of the method of FIG. 7A, wherein the energy zone is unobstructed between the energy zone and the connection interface.

The step 76 of positioning the energy source 78 may also include positioning the energy source 78 such that the energy zone is unobstructed between the energy source 78 and the connection interface 26, as shown in FIG. 7C. In these embodiments, the energy source 78 has a direct line of sight from the connection interface 26 and through the opening defined by the turbocharger 10, particularly the turbine housing outlet 38 defined by the turbine housing 12. The direct line of sight is required so that the energy source 78 is able to transmit energy through the energy zone 80 to the connection interface 26 to fix the valve body 22 to the shaft 24, without having the energy being interrupted from reaching the connection interface 26 due to the energy zone 80 being obstructed. Moreover, the step 76 of positioning the energy source 78 proximate to the wastegate assembly 20 such that the energy zone 80 is angularly tilted from the first axis A1 normal to the first plane 28 at which the valve body 22 and the valve seat 18 are engaged eliminates conflicting design goals relating to the placement of the wastegate assembly 20 and reaching emissions targets.

More specifically, the method 70 allows manufacture of the turbocharger 10 with the wastegate assembly 20 having the optimal placement to evenly direct the flow of exhaust gas over the catalyst brick face to minimize the time elapsed between start-up and the catalyst brick face reaching operating temperature. The method 70, therefore, allows manufacture of the turbocharger 10 with the wastegate assembly 20 having the optimal placement to purify exhaust gas during start-up of the internal combustion engine, preventing flow of exhaust gas from impinging on and transfer heat to the turbine housing 12, advantageously resulting in better performance in achieving emissions targets.

Figure 7D:
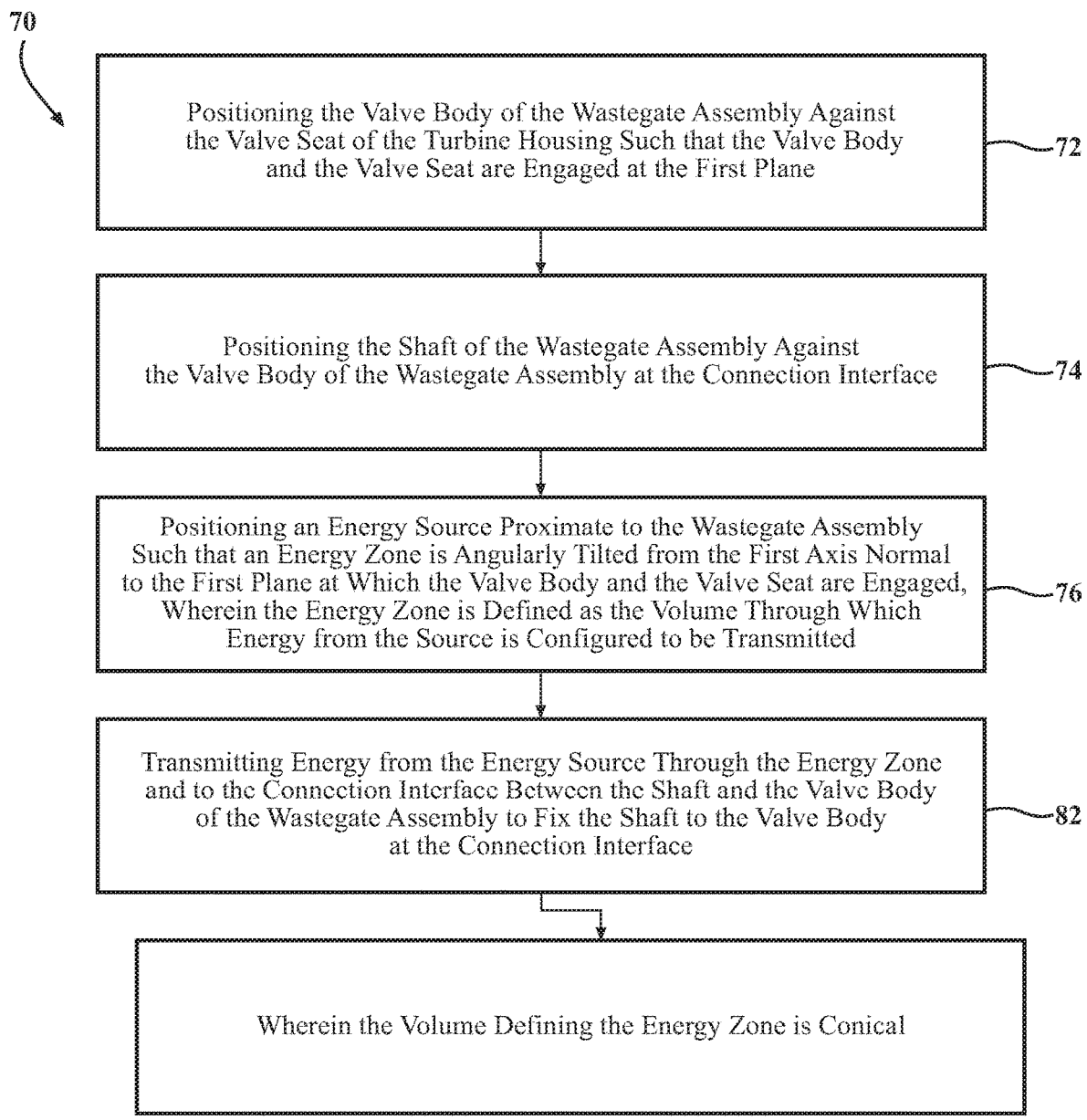
FIG. 7D is a flow chart of the method of FIG. 7A, wherein the energy zone is defined as the volume through which energy from the energy source is configured to be transmitted, and wherein the volume defining the energy zone is conical.

In some embodiments, the volume defining the energy zone 80 is conical, as shown in FIG. 7D. The volume defining the energy zone 80 being conical becomes a design constraint the greater the distance between the wastegate assembly 20 and the turbine housing outlet 38 of the turbine housing 12. More specifically, the further the wastegate assembly 20 is from the turbine housing outlet 38 of the turbine housing 12, the greater the cross-sectional area of the volume and the greater the likelihood of the energy zone 80 being obstructed by the turbine housing 12. Therefore, the wastegate assembly 20 having the connection interface 26 angularly tilted is increasingly advantageous the further the wastegate assembly 20 is from the turbine housing outlet 38 of the turbine housing 12. However, in other embodiments, the volume defining the energy zone is pyramidal, rectangular, or oval, among other possible shapes. It is to be appreciated that the geometry of the volume defining the energy zone is dependent upon, but is not limited to, the particular energy source 78 used to fix the shaft 24 and the valve body 22.

Figure 7E:
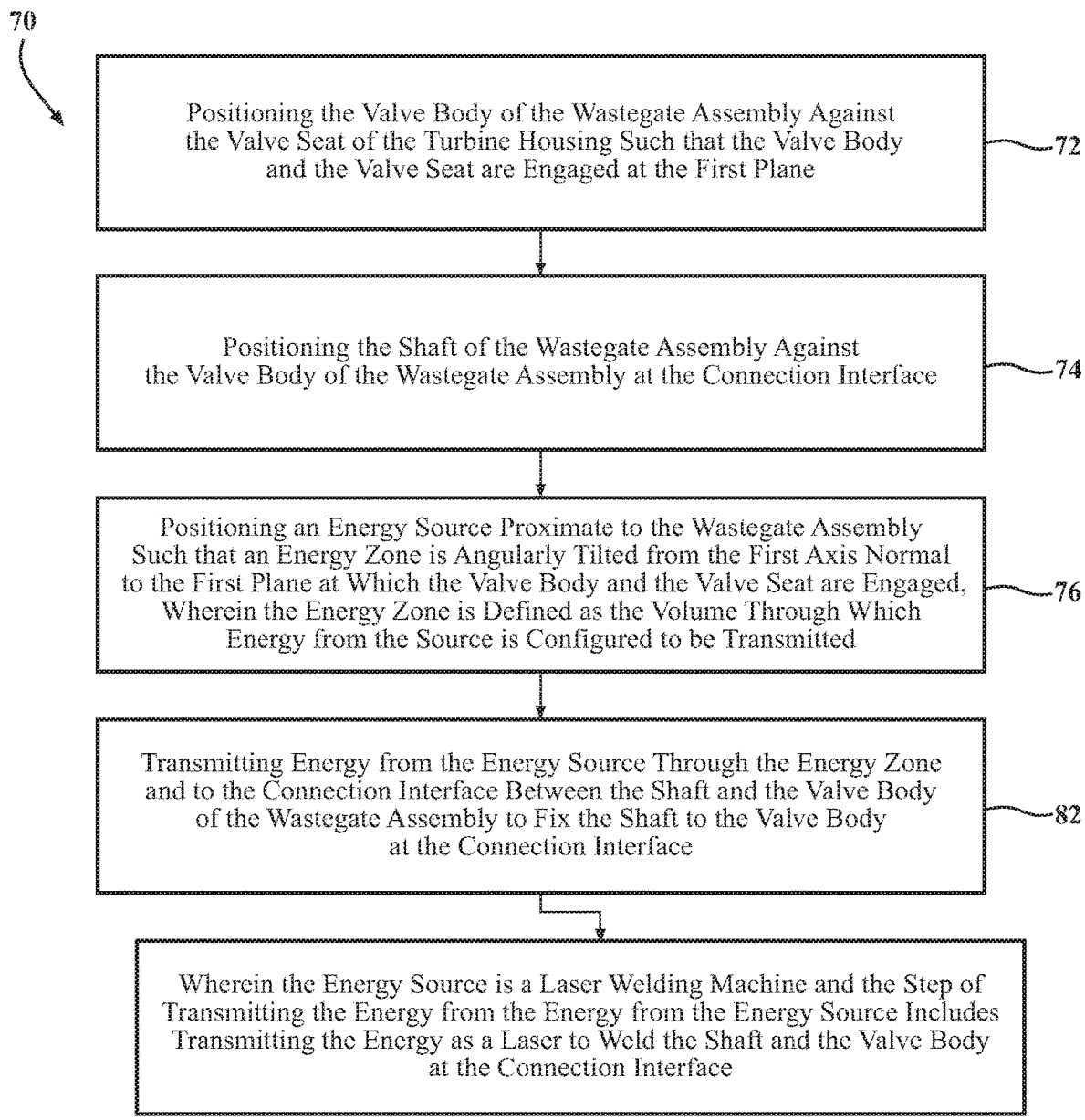
FIG. 7E is a flow chart of the method of FIG. 7A, wherein the energy source is a laser welding machine and the step of transmitting the energy from the energy source includes transmitting the energy as a laser to weld the shaft and the valve body at the connection interface.

In some embodiments, as shown in FIG. 7E, the energy source 78 is a laser welding machine 88 and the step 82 of transmitting the energy from the energy source 78 includes transmitting the energy as a laser to weld the shaft 24 and the valve body 22 at the connection interface 26. The shaft 24 and the valve body X being welded together at the connection interface 26 provides a permanent and structurally strong connection between the shaft 24 and the valve body 22. It is to be appreciated that in other embodiments, the energy source 78 is, for example, a metal inert gas welding machine (MIG), a metal active gas welding machine (MAG), a tungsten inert gas welding machine (TIG), a stick welding machine, an electron beam welding machine, an ultrasonic welding machine, or the like.

Figure 7F:
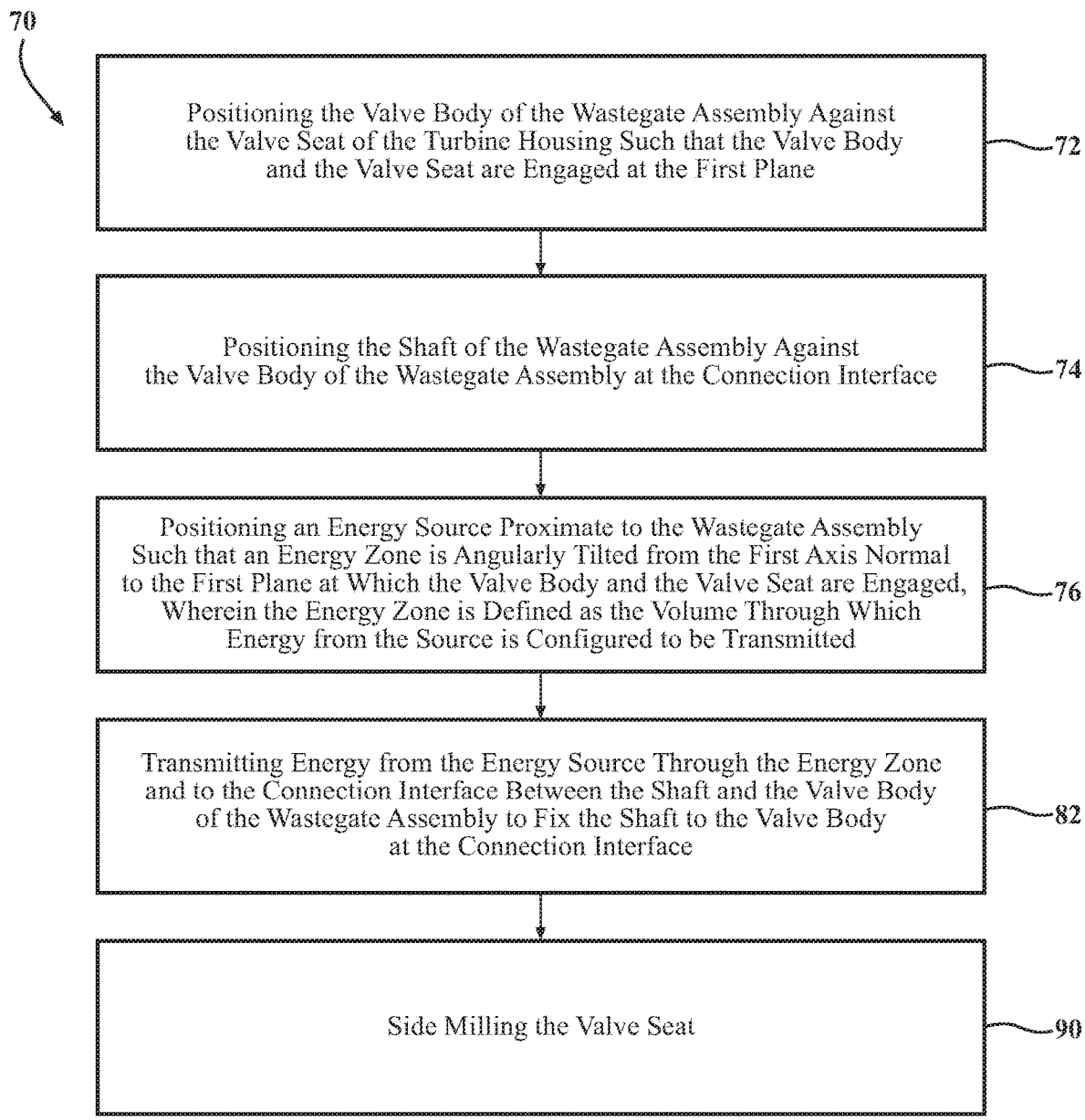
FIG. 7F is a flow chart of the method of FIG. 7A, further including the step of side milling the valve seat.

The method 70 may further including the step 90 of side milling the valve seat 18, as shown in FIG. 7F. The step 90 of side milling the valve seat 18 allows the valve seat 18 to be in a location on the inner surface 68 of the turbine housing 12 where the valve seat 18 does not face the turbine housing outlet 38 of the turbine housing 12. Said differently, the step 90 of side milling the valve seat 18 allows the valve seat 18 to extend as close as possible to parallel to a third axis A3 about which the turbine wheel 62 is configured to rotate. The valve seat 18 extending parallel to the third axis A3 further directs the exhaust gas flowing through the wastegate channel 16 of the wastegate duct 14 evenly over the catalyst brick face, further reducing emissions of the turbocharger 10.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine, said turbocharger comprising:
a turbine housing having a wastegate duct defining a wastegate channel and a valve seat disposed about said wastegate channel; and
a wastegate assembly having a valve body engageable with said valve seat and a shaft fixed to said valve body at a connection interface for selectively engaging said valve body with said valve seat at a first plane, said connection interface having a centroid and a second plane tangential to said centroid, with a second axis normal to said second plane being angularly tilted relative to a first axis normal to said first plane at which said valve body and said valve seat are engaged.

2. The turbocharger as set forth in claim 1, wherein said valve body and said shaft are welded at said connection interface such that said connection interface has a weld line that is angularly tilted relative to said first axis normal to said first plane.

3. The turbocharger as set forth in claim 1, wherein said second axis normal to said second plane is angularly tilted relative to said first axis normal to said first plane at a first angle between 10 and 70 degrees.

4. The turbocharger as set forth in claim 1, wherein said valve body at said connection interface is convex in relation to said first plane.

5. The turbocharger as set forth in claim 1, wherein said valve body at said connection interface is concave in relation to said first plane.

6. The turbocharger as set forth in claim 1, wherein said valve body has an upper surface extending substantially parallel to said first plane, and has a shaft receiver extending away from said upper surface of said valve body, with said shaft receiver defining said connection interface.

7. The turbocharger as set forth in claim 6, wherein said shaft receiver has a first portion extending a first distance away from said upper surface at a point on said first portion furthest away from said upper surface, and has a second portion extending a second distance away from said upper surface at a point on said second portion closest to said upper surface, with said first distance being greater than said second distance.

8. The turbocharger as set forth in claim 7, wherein said shaft has a curved portion being substantially C-shaped that extends such that said first portion of said shaft receiver is disposed between said curved portion of said shaft and said upper surface of said valve body.

9. The turbocharger as set forth in claim 7, wherein said first and second portions of said shaft receiver together define an outer rim extending circumferentially about said second axis normal to said second plane.

10. The turbocharger as set forth in claim 9, wherein said outer rim extends at a third plane, with said third plane being angularly tilted relative to said first axis normal to said first plane at a second angle between 10 and 70 degrees.

11. The turbocharger as set forth in claim 1, wherein said first axis normal to said first plane does not extend through a turbine housing outlet defined by said turbine housing.

12. The turbocharger as set forth in claim 1, wherein said second axis normal to said second plane tangential to said centroid of said connection interface extends through a turbine housing outlet defined by said turbine housing.

13. The turbocharger as set forth in claim 1, wherein said wastegate assembly is a dual block wastegate.

14. The turbocharger as set forth in claim 1, wherein said wastegate duct has a cylindrical wall extending from an inner surface of said turbine housing to said valve seat.

15. A method of manufacturing a turbocharger for delivering compressed air to an internal combustion engine, with the turbocharger comprising a turbine housing having a wastegate duct defining a wastegate channel and a valve seat disposed about the wastegate channel; and a wastegate assembly having a valve body engageable with the valve seat and a shaft engageable with the valve body at a connection interface for selectively engaging the valve body with the valve seat at a first plane, the connection interface having a centroid and a second plane tangential to the centroid, with a second axis normal to the second plane being angularly tilted relative to a first axis normal to the first plane at which the valve body and the valve seat are engaged, said method comprising the steps of:

positioning the valve body of the wastegate assembly against the valve seat of the turbine housing such that the valve body and the valve seat are engaged at the first plane;

positioning the shaft of the wastegate assembly against the valve body of the wastegate assembly at the connection interface;

positioning an energy source proximate to the wastegate assembly such that an energy zone is angularly tilted from the first axis normal to the first plane at which the valve body and the valve seat are engaged, wherein the energy zone is defined as a volume through which energy from the energy source is configured to be transmitted; and transmitting energy from the energy source through the energy zone and to the connection interface between the shaft and the valve body of the wastegate assembly to fix the shaft to the valve body at the connection interface.

16. The method as set forth in claim 15, wherein the step of positioning the energy source further includes positioning the energy source such that an energy line extending from the energy source, through a volume centroid of the energy zone, and to the connection interface is angularly tilted at a third angle between 10 and 70 degrees from the first axis normal to the first plane.

17. The method as set forth in claim 15, wherein the energy zone is unobstructed between the energy source and the connection interface.

18. The method as set forth in claim 15, wherein the volume defining the energy zone is conical.

19. The method as set forth in claim 15, wherein the energy source is a laser welding machine and the step of transmitting the energy from the energy source includes transmitting the energy as a laser to weld the shaft and the valve body at the connection interface.

20. The method as set forth in claim 15, further including the step of side milling the valve seat.

\* \* \* \* \*